Nov. 2, 1926.

E. S. MATTHEWS 1,605,450

RECORDING FLUID DISPENSING APPARATUS

Filed Dec. 12, 1917  3 Sheets-Sheet 1

INVENTOR
Edwin S. Matthews

Patented Nov. 2, 1926.

1,605,450

UNITED STATES PATENT OFFICE.

EDWIN S. MATTHEWS, OF NEW YORK, N. Y.

RECORDING FLUID-DISPENSING APPARATUS.

Application filed December 12, 1917. Serial No. 206,818.

My present invention relates to recording fluid dispensing apparatus whereby a given quantity of fluid (more or less, as may be desired) is dispensed and the amount of the same is recorded.

This present invention produces a check whereupon the quantity dispensed is recorded in figures, so as to be easily read, and also records upon this check an identifying character designating the individual dispensing the fluid; and in the embodiment of the invention herein set forth it produces two checks, one for the purchaser, as above mentioned, recording the amount of his individual purchase and the dispenser thereof, which is torn off from the machine and given to the purchaser; and also another check, which is a continuous owner's record, upon which the purchasers' checks, as above mentioned, are recorded, in sequence, in such a manner that the total actual amount of fluid dispensed in any given period (such as a day or week, etc.) is readily ascertained from plain figures.

This invention also provides for the writing upon these checks a notation by the dispenser such as "For Cash", "Charge Richard Roe" or other appropriate memorandum.

This invention is of utility to sellers and purchasers of gasolene or other fluid, which is to be dispensed in varying amounts and of which an accurate record is desired.

The apparatus cannot be operated until unlocked by some individual dispenser's key, and this key is retained within the apparatus until the dispensing and the recording thereof has been completed, upon which it is withdrawn; and no fluid can be dispensed without being recorded unless the dispenser's key remains locked in the apparatus to identify the faulty operator.

Features of this invention are found in the simple and useful character of the records produced, which show the quantities dispensed in plain figures avoiding the interpretation of graphically traced lines used in other apparatuses; the simplicity of instrumentalities employed and the positiveness of operation of the apparatus; further in the safeguarding against faulty manipulation thereof and also in the manner of producing the records attained by causing the operation of the discharging apparatus to print upon the records appropriate figures and graduations during the period of its operation; so that the record of the quantity of fluid discharged obtained is accurate, and is unaffected by the possible slippage of the record strips; is independent of the extent of the record or any calibration of record strips, being designated thereupon by the stamped index mark of the separately operated recording apparatus; and further also in the ease with which renewed supplies of material may be incorporated in the apparatus, and in the novel provision for conveniently issuing checks therefrom; while other features of this improvement will become manifest to those skilled in the art as its instrumentalities and operation are later explained and its novel features are pointed out in the claims.

The exemplifying structure herein shown, which embodies this invention, is illustrated by the following drawings.

The mechanism of this embodiment of the invention will now be described mentioning first, briefly, the discharging apparatus; then the paper tape and transfer copying ribbon supply supporting and advancing mechanism; followed by a description of the tape printing mechanism, then the recording mechanism and finally the interlocking mechanism.

Figure 1:
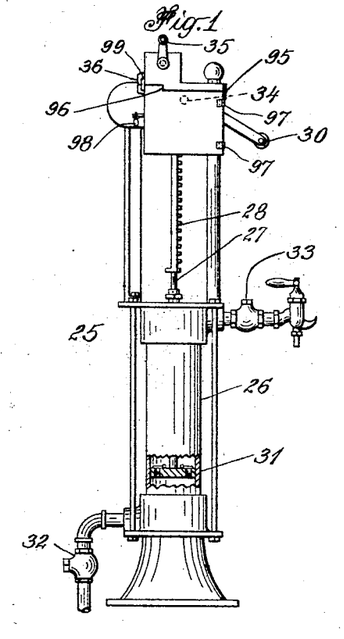
Figure 1 is a front elevation (partly broken section) of the recording fluid dispensing apparatus.
Figure 2:
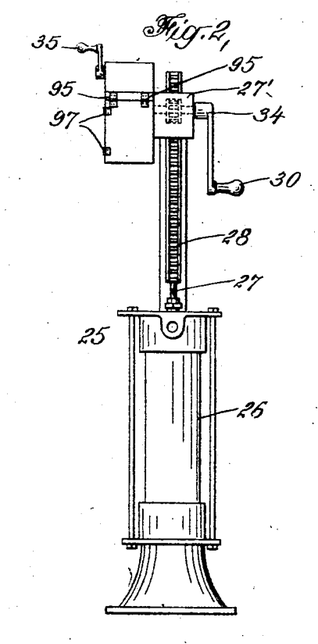
Figure 2 is a side elevation of the same.

In Fig. 1 and Fig. 2, 25 represents a well known pump discharging apparatus having a pump cylinder 26, a piston rod 27, extended into a rack 28, operated vertically, upward and downward, by the pinion 27′, which is reversibly revolved by the dispenser by means of the crank handle 30. The pump rod is secured to the valved piston 31, suitable check valves being located at 32 and 33; this being a single acting pump discharging during the upward motion of its piston only.

The cylinder is of suitable diameter, so that each complete upward stroke of the pump discharges a known quantity of fluid, say in this instance one gallon, and the pinion shaft 34 obviously has a definite fixed amount of rotation for any given discharge.

The pinion shaft is extended into the check producing apparatus for the purpose of actuating the registering or indicating wheels of the same, and of interlocking the pump with the recording apparatus; although obviously any pinion shaft, properly connected to the pump, whether directly rotated by the dispenser or not, would answer equally well for this purpose. In Fig. 1 and Fig. 2, 35 is the dispenser's handle for operating the check producing apparatus, and the purchaser's check issues at 36.

Figures 4, 5, 6, 7, 8, 9, 10, 11:
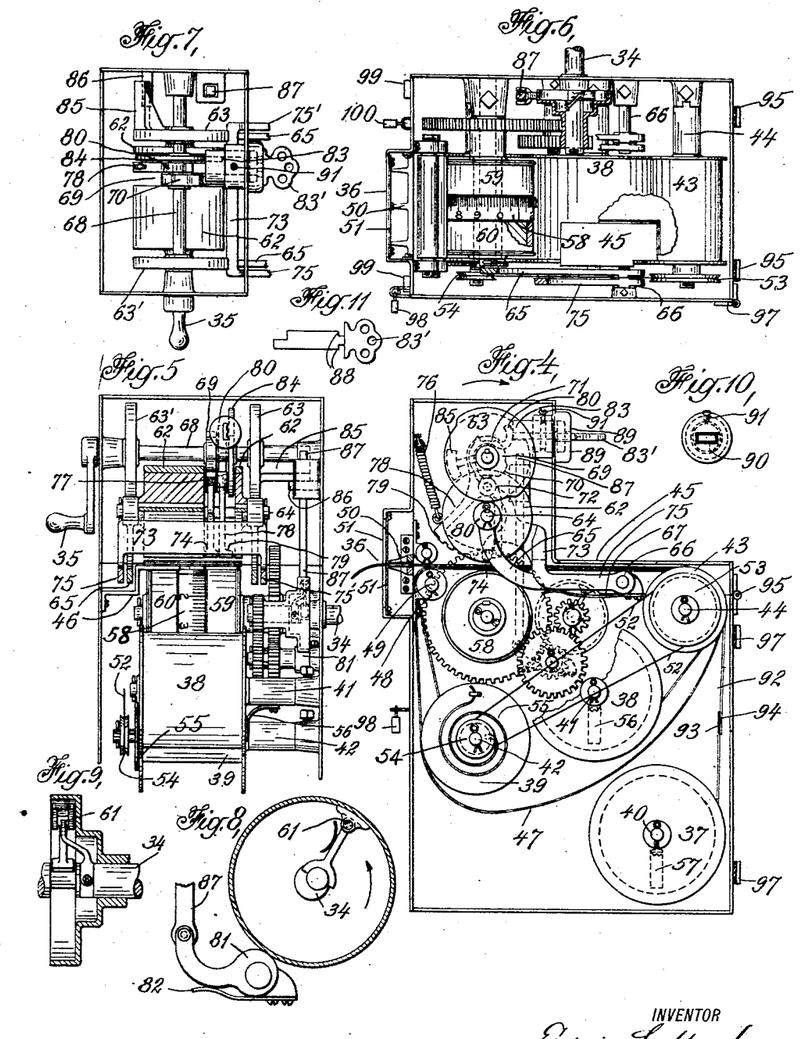
Figure 4 is a front elevation (one paper roll being shown partly broken) of the check producing portion of the apparatus with the front side of its enclosing box removed so as to show clearly all parts of the apparatus.
Figure 5 is a side elevation of the same (partly broken and partly in section) with the right hand roll of paper supply and the right hand carrier roll and the transfer ribbon omitted.
Figure 6 is a plan view (partly broken) of the same with the key interlocking and recording mechanism and top cover (except at writing shelf) removed.
Figure 7 is a plan view (partly broken) of the key interlocking and recording mechanism removed from the remainder of the apparatus.
Figure 8 is an end elevation of the discharge interlocking and discharge transmission ratchet mechanism.
Figure 9 is a side sectional elevation (partly broken) of the discharge transmission ratchet mechanism.
Figure 10 is an elevation of the key scutcheon.
Figure 11 is an elevation of one of the dispenser's keys.
Figures 12, 13:
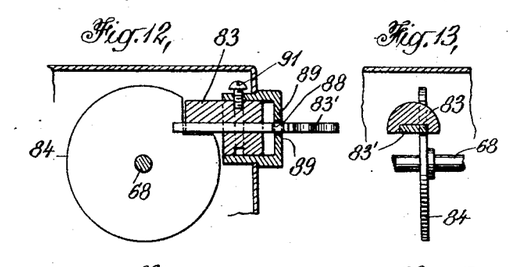
Figure 12 is an enlarged side elevation, partly in section, of the key 83′, lock barrel projection 83 and disk 84 removed from other portions of the apparatus showing the apparatus before it is unlocked with the key barrel projection engaging the disk so that rotation of the latter by the operator is prevented.
Figure 13 is a similar end view of the same.
Figure 14:
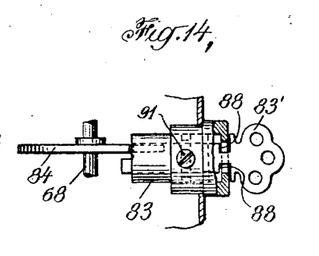
Figure 14 is a similar top view of the same.

In Figure 4, 37 is the roll carrying paper tape for the purchaser's check supply (this paper being preferably translucent); 38 is the roll for the owner's record tape supply and 39 is the roll upon which the owner's record is wound up by the action of the apparatus; all these rolls being carried upon studs mounted at the rear side of the apparatus so that the rolls (37, 38 and 39 respectively) may be readily removed therefrom or placed upon them from the front of the apparatus. The owner's record only may be made upon translucent paper, if desired, by reversing the type characters (or making them read like ordinary type) upon the printing roll later to be described.

An endless band of copying ribbon or transfer ribbon 47 is carried between these two paper record tapes and with them over carrier roll 43, running loose upon stud 44; thence passing under the dispenser's notation aperture 45, over the writing shelf 46 (see Fig. 5), this shelf being located underneath the notation aperture 45, and continuing over the printing roll 58 to the carrier roll 48 revolving loose on shaft 49. These carrier rolls are provided with flanges for guiding the tapes and ribbon.

At this point the purchaser's check tape diverges from the owner's record tape; the former continuing horizontally through the double supporting comb 50, and through the aperture 36 between the sharpened edges of the thin flexible door plates 51, which border the aperture, against which sharpened edges it is torn off for the use of the purchaser. These door plates are either spring hinged or, as in Fig. 4, are made sufficiently thin and flexible so that they may be pushed inwards by the finger and thumb of the dispenser who thus grasps the tape of the purchaser's check between the separated teeth of the comb 50, which support it, and draws out from the apparatus a proper amount to form a check in case the tape has not been sufficiently advanced by the printing roll 58 (to be later described) to be easily grasped. This feature of the invention may be varied in form, and only one border plate or a single comb may be employed, if desired, without departing from the intent of the invention. The side edges of the supporting double comb 50 also form a guide for the tape.

The owner's record tape (with the copying or transfer ribbon) proceeds around carrier roll 48 to the owner's record roll 39 upon which the owner's record tape is wound by the revolution of the roll 39 caused by the friction belt 52, which receives motion from a V pulley 53 attached to the carrier roll 43 and transmits its motion to a smaller sized pulley 54 running loose on stud 42 but connected to the owner's record roll by the flat spiral spring 55 which acts as a constant tension equalizer and a reservoir of power for causing the revolution of roll 39.

Spring clips 56 and 57, for owner's supply roll 38, and purchaser's check supply roll 37 respectively, are attached to the studs carrying these rolls and are adjusted to press gently against them producing a slight friction so that the paper supply may not be overhauled.

The endless copying or transfer ribbon 47 passes around the roll 39 and between the rolls 37 and 38 to roll 43 as before mentioned.

The checks formed by this embodiment of the invention bear printed numbers and graduations reading, in this embodiment, in gallons subdivided into eighths of a gallon, these numbers repeating themselves every ten gallons.

These numbers and graduations are formed in raised characters upon the printing roll 58 along the middle portion or thereabouts of the face of the circumference of this printing roll 58 (see Figs. 4, 5 and 6).

Figure 3:
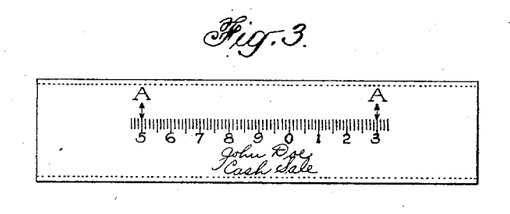
Figure 3 is a view of the purchaser's check as produced by the operation of the apparatus.

The portion 59 of the face of the roll 58 is rubber covered, while the portion 60 is depressed sufficiently not to come into close contact with the record tapes. Near the edges of the face of printing roll 58 raised rings of dot forming projections are placed to assist in properly feeding the tapes during the printing process; and these rings preferably mark the record tapes in the horizontal rows of dots seen near its side edges as shown in Fig. 3.

This printing roll 58 is revolved from the discharging motion only, of the discharging mechanism of the apparatus, being advanced proportionately to the amount of that discharged by the train of gear wheels shown attached thereto (see Fig. 4, Fig. 5 and Fig. 6), all of which are carried upon studs from the back side of the apparatus so that they do not interfere with the insertion or removal of paper tape or transfer ribbon supply.

A pinion shaft 34 from the discharging apparatus carries upon it the friction noiseless internal ratchet 61 (although an ordinary internal ratchet may be employed, if desired), which carries upon its hub the first motion transmitting pinion of the train of gear wheels above mentioned (see Fig. 5, Fig. 6 and Fig. 4), and gives it motion only as shown by the arrow in Fig. 8, when the piston of the discharging apparatus is moving upwardly and consequently discharging fluid.

If a toothed ratchet of any form be employed in place of the constantly contacting friction ratchet of this invention (see Figs. 8 and 9) for driving the member of any apparatus of the kind or character described which by its motion indicates the amount of discharge, an error will be introduced into such indication from lost motion or slip between the pawl and the teeth of the ratchet, as is well known.

If the pitch of the ratchet teeth is made fine to minimize such error, the ratchet is too weak, soon wears out, and becomes unreliable; and the amount of constantly recurring cumulative error even in such a case vitiates the utility of the apparatus.

If the ratchet tooth pitch is made coarse for strength and security, it is possible to work the pump in repeated short strokes so as to discharge fluid without the discharge indicating member being moved at all.

One of the objects of this invention is to obviate such defects in fluid discharge denoting apparatus; for when the pump piston is descending preparatory to the delivery of fluid, the ratchet pad at 61 (see Figs. 8 and 9), although held in absolute contact with the ratchet rim by the spring shown in Figs. 8 and 9, nevertheless slips around upon it; for at such times the motion or shaft 34 is opposite in direction to that shown by the arrow of Fig. 8, and the friction of such motion is not sufficient to rotate the discharge indicating member (which in this case is roll 58, see Fig. 4) for there is considerable resistance to its motion, as is elsewhere set forth in this specification.

When the motion of the pump piston is reversed for the discharge of fluid, and shaft 34 moves as shown by the arrow of Fig. 8, the knuckle joint action of the eccentric pivot of this shaft, through the lever connecting it with the pad at 61, pinches this pad upon the ratchet rim with which it is already in close contact, with an unslippable grip without any appreciable lost motion, for it is only necessary in its operation to increase the pressure upon a contact already closely made.

The friction of the pad at 61 of this form of ratchet aids and reenforces the resistance of the apparatus against pulling the purchaser's record tape out from the machine during its engagement with the discharge indicating member; thus preventing the possibility of a check being drawn from the machine showing a discharge in excess of that which has actually taken place.

The operation of the apparatus causes the tapes and transfer ribbon to be compressed upon the printing roll 58, as will be later explained, thus printing a record somewhat greater in extent or length than the actual discharge of fluid would call for, but upon which the actual discharge is accurately marked by the recording mechanism, as will also be later explained (for this marking see double headed arrows shown on check in Fig. 3).

The compression for printing is occasioned by the squeezing of the rubber faced compression roll 62 against tapes, ribbon and roll 58 caused by the raised surfaces of cams 63 and 63' being brought into opertion when the dispenser proceeds to liberate the apparatus for action, as later described; this roll 62 being carried by shaft 64 which is supported from its outside ends by two curved arms 65 supported on studs 66 and it is held away from the printing roll and against the surfaces of cams 63 and 63' by leaf springs 67 one being provided for each arm, but is compressed upon the printing roll whenever the raised surfaces of cams 63 and 63' are in action.

The cams 63 and 63' which depress the compression roll upon the printing roll are so constructed in this apparatus as to cause an effective pinching and pressure upon the tape and these rolls when they are in engagement; hence as a result of this engagement pulling of the tape in any direction is prevented, and the tape will be torn in any such attempt.

Hence in this apparatus the tape is positioned and held firmly by the machine during all the time when it may be marked by it; thus avoiding any possible falsification of the record by the pulling, manipulating or displacement of the tape or apparatus which may occur in other machines not possessing this feature of operation.

This rubber faced compression roll 62 is made in two portions or sections, as shown in Fig. 5 and Fig. 7 in order to feed the record strips at both edges during the printing process; and between these sections a portion of the recording apparatus is located, as will be later described. This rubber faced compression roll 62 is also employed to compress the tapes upon the printing roll 58 during the process of renewing the tape supply or retaping the apparatus, as will be later described.

Supposing the apparatus to have been unlocked for operation by means of one of the dispenser's keys (which will be later explained in describing the interlocking mechanism), the operator now turns the handle 35 about 180°; that is in the direction of the arrow shown in Fig. 4, as far as possible, thus rocking the shaft 68 to which it is connected.

A result of this movement is the application of compression for printing purposes above described, while immediately thereafter the double headed arrow index mark and the character designating the individual dispenser's key employed are imprinted upon the paper tapes forming the initial record shown at the left hand in Fig. 3.

At about the middle portion of shaft 68 the cam 69 is located, having the raised surface 70 and the depression 71 upon its face (see Figs. 4, 5, 7 and 18).

The rocking of shaft 68 causes the raised surface 70 of cam 69 to depress the hub 72 at the top of the fork of the recording bar 73 momentarily, as it swings by the upward projection of this hub, sufficiently to imprint the double headed arrow index mark, carried at the lower end 74 (see Fig. 4, Fig. 5, Fig. 18 and Fig. 19) of the fork of this bar, upon the record tapes. The fork of the recording bar 73 is integral with the bar itself, projecting therefrom near the middle of this bar 73, as a forked arm so as to clear shaft 64; while from the ends of recording bar 73, two arms 75 and 75', also integral with the bar, project in an opposite direction from the fork to studs 66 already mentioned; upon which they are pivoted, and it is held upwardly against the face of cam 69 by spring 76, which is attached to the identifying character segment 78 (see Figs. 7, 4 and 18) carried by hub 72 by means of a stud 77 (see Fig. 5, Fig. 18 and Fig. 19), fast therewith, upon which the identifying segment 78 rocks, or additional leaf springs (such as 67) may be employed, if desired, for the purpose of holding this member against the cam face actuating it.

This identifying character segment 78 bears upon its lower circular surface 79, type formed characters (in the present instance A, B, C, etc) one of which imprints upon the record tapes an identification of the indivdual dispenser's key, which is used to unlock the apparatus co-incidently with the printing of the index mark.

Figure 18:
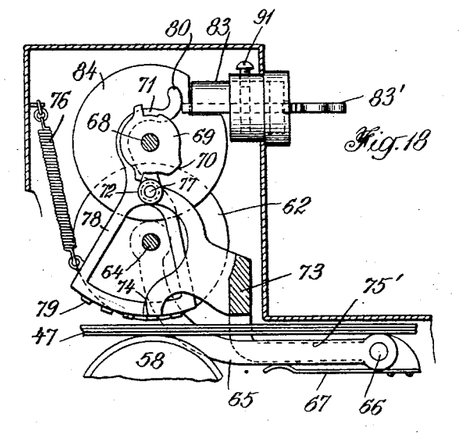
Figure 18 is an enlarged side view of cam 69 recording bar 73 (sectioned in a middle portion thereof) showing one of its pivoting arms 75, also hub 72 located at the top of the fork integral with and projecting from the bar near its center, identifying character segment 78, carried by hub 72 and pivoted thereon, tooth 80 of this segment showing its engagement with key 83 and spring 76 attached to this segment and holding it engaged with the key by the pressure which it exerts; the printing and compression rolls and the shaft of the latter being shown to illustrate the clearing of this shaft by the cut out portion of segment 78.
Figure 19:
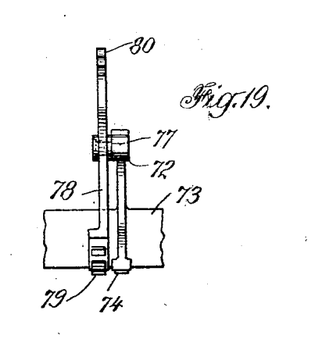
Figure 19 is an end elevation of the fork of the recording bar with hub 72 at its top and index markers 74 at its bottom, segment 78 and connecting stud 77 removed from other portions of the apparatus.

The segment 78 swings upon stud 77 according to the extent that tooth 80, forming the upper portion thereof, is pushed forward by the particular length of the dispenser's key employed; being held against said key elastically by spring 76 (see Figs. 18 and 19).

It thus brings the proper character into imprinting position opposite the double headed arrow index mark, which is in a fixed central position at 74.

The lower part of this segment 78 is cut out in a somewhat triagular form as shown at 80' (Fig. 4) so as to clear the shaft 64.

The recording mechanism thus imprints its initial marking upon the record tapes while the final marking (see right hand record mark on Fig. 3)—after the proper discharge of fluid has been effected—is imprinted in a similar manner by the backward movement of handle 35 to its initial position, which is rendered necessary in order that the dispenser's key may be removed from the apparatus.

In the initial state of the apparatus as a whole, previous to the unlocking of the same by the dispenser's key, no portion of it can be operated.

The pinion shaft of the discharging apparatus cannot be rotated, so as to cause fluid discharge, for it is locked against such motion by the friction ratchet 81 (in place of which an ordinary form of ratchet may be used, if desired) which is held against the rim of ratchet wheel by leaf spring 82 (see Figs. 8 and 4); neither can shaft 68 be rocked, for the edge of the right angled segment cut out of disk 84 (which is fast to shaft 68) is now bearing against the approximately semi-circular extension or projection of the lock barrel at 83 (see Figs. 4, 7, 12, 13 and 14), as this was necessarily left in this position when the former dispenser's key was withdrawn from the apparatus, as will be later explained.

The shaft 68 cannot be rotated backwardly for at this time the projecting bracket 85, carried upon the rear side of cam 63, is seated against the back stop 86, projecting from the rear side of the enclosing box (see Figs. 5 and 7).

Figure 15:
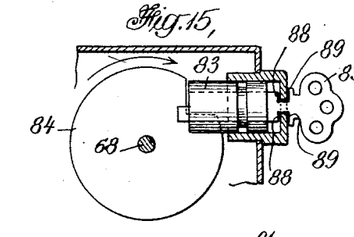
Figure 15 is another side elevation of the same parts showing this portion of the apparatus after it is unlocked with the key 83′ and key barrel projection 83 swung around to the side of the disk 84 and no longer preventing its rotation by the operator and also showing that the rotation of disk 84 by the operator (possible at this time only in the direction of the arrow shown in this figure) will immediately engage the lock barrel projection 83 and prevent the rotation of the key back to the position in which it can be withdrawn from the lock.

A dispenser's key is inserted, thereby positioning the identifying segment 79, according to its individual length, as heretofore described, and the key is rotated 90° to the position shown in Figs. 5, 15, 16 and 17, thus bringing it and the projection 83 of the lock barrel out of the path of the disk 84, thereby permitting the rocking of the shaft 68 by the dispenser in the direction shown by the curved arrow at the top of Fig. 4 and in Fig. 15, which, after causing the printing upon the record tapes of the initial marking as heretofore described, causes by its continued rotation the projecting bracket 85 to impinge upon the discharge releasing pitman 87, thereby liberating the pump pinion shaft 34 by releasing the same from the restraint of friction ratchet 81 (see Figs. 5, 6, 7 and particularly Fig. 8).

When this takes place the upward projection of hub 72 enters the depression 71 of cam 69, (see Fig. 18) thus locking the apparatus in this position strongly enough to compress spring 82, but not forcibly enough to prevent the rocking of the shaft 68 in the opposite direction when required by the operator.

It will be noted that the release of the discharging part of the apparatus for operation cannot take place until compression roll 62 has been brought into action, and also the initial record with its index mark showing the exact position of printing roll 58, and also the identifying mark of the individual dispenser have been imprinted.

The discharging part of the apparatus is now operated and the proper numbers of graduations are continuously printed upon the record tapes by the revolution of printing roll 58 during this operation; for the compression roll 62 remains depressed upon the printing roll 58 during this process by the continued engagement of the long raised portions of cams 63 and 63' with the hubs of the curved arms 65 carrying shaft 64 upon which the compression roll 62 revolves: —while previous to this operation, and before the discharging apparatus is liberated, the first portion of the revolution of handle 35 at its first operation by the dispenser not only actuates these long holding cams 63 and 63' but also the quick-acting and quick-releasing cams 69 which latter momentarily engages hub 72 causing the imprinting of the initial record index mark and the key identifying character upon the tape and the quick withdrawal of their printing types therefrom, at or near the beginning of the first operation of handle 35 by the dispenser.

Another stamping of the key identifying character and the index mark occurs at or near the end of the dispenser's last operation at the handle 35 (reverse motion thereof) at which time the final record index mark is made, after the desired discharge has been effected, the continuous printing completed and the discharging apparatus is locked, as cam 69 in its reverse motion again momentarily engages hub 72, before key 83 is released, as will be readily understood from the previous description.

The required quantity of fluid is now dispensed; after which the handle 35 is revolved back to its initial position, first locking the discharging means against further operation by bringing the ratchet 81 into action through the withdrawal of the pressure of bracket 85 from pitman 87; then imprinting the final marking upon the record tapes by the actuation of the index marker and identifying character marker through the momentary impinging of cam 69 upon hub 72; later releasing the compression roll from contact with the printing roll by bringing the lowered surfaces of cam 63 and 63' in contact with the hubs of the curved arms 65 which carry the shaft 64 upon which the compression roll 62 revolves, and finally placing the apparatus in position shown in Fig. 5 with the right angled cut-out segment of disk 84 opposite the projection 83 of the lock barrel where the dispenser's key can be rotated back to its initial position and removed from the apparatus.

Figure 16:
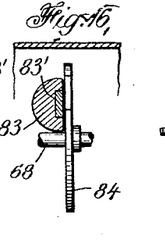
Figure 16 is a similar end view of the same.
Figure 17:
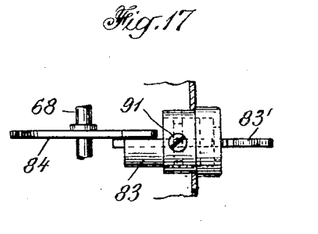
Figure 17 is a similar top view of the same.

The dispenser's key 83' can be inserted into the apparatus and withdrawn therefrom only horizontally, as is seen by the position of the aperture of the scutcheon in Fig. 10 for in any other position the shoulders 88 (Fig. 11) are engaged against withdrawal by the flange 89 (see Fig. 4) of the scutcheon; and after this key has been turned to unlock the apparatus (as in Fig. 5), and the operation of the apparatus has begun, it cannot be rotated because the side of the key abuts upon the side of disk 84, which engages it and the lock barrel projection 83, at the first motion given the apparatus in operating it, and retains them engaged until the complete operation is concluded (see Figs. 15, 16 and 17 where arrow shows direction of motion of disk 84 engaging key as above mentioned). A stop 90 placed in the scutcheon limits the rotation of the key to the proper amount, and a screw 91 is adjusted so as to cause the necessary friction to retain the barrel in its proper angular position.

A feature of this invention is also found in its provision for the renewal of an exhausted supply of record tape and for the insertion of a new transfer ribbon whenever these operations may become necessary.

The record tapes of this invention are provided with means for coupling or linking the new supply upon the portion of the old supply tape still remaining in the apparatus. In this embodiment of the invention the new supply tape is wound upon a roll, and, as it is unrolled, the outer end of this tape, at its beginning, is provided with linking means consisting of a strip of adhesive gum (similar to, but rather more extensive than the gum upon an envelope flap) which is readily moistened and by means of which the new tape is easily coupled or linked to the portion of the old supply tape remaining in the machine.

In Fig. 4 a new supply of purchaser's check tape, leading from the roll 37, is shown coupled to the old portion of purchaser's tape 92 at 93, the coupling means being shown at 94.

When a new supply roll is introduced the old tape is clamped in fixed position (so that its adjustment through the apparatus and slot 36 may not be disturbed during the coupling process) by unlocking the apparatus and depressing the compression roll 62 (by turning the handle 35 to the required position) upon the printing roll 58, which is stationary, at this time; thus pinching the old tape thereto.

After the coupling is completed the compression roll 62 is released (by turning handle 35 back to its original position), and the tapes are pulled through the apparatus at slot 36 until the coupled portion has issued therefrom, whereupon the purchaser's tape is severed.

In case the owner's record roll is coupled, the operator pulls enough tape from the slot 36 to insure that the coupled portion of the tape has passed beyond the printing roll, which is readily determined by looking within the enclosing box. Each of the supply rolls of this apparatus, as usually constructed, (although this is not a necessity or fixed principle of construction), contains a little more than twice the amount of paper required to fill the owner's record roll.

Whenever it becomes necessary to renew the transfer ribbon (which occurs infrequently) the top cover of the box or of the main body of the apparatus is swung upwardly about the hinges 95, leaving the tapes and ribbon fully exposed throughout their upper horizontal course through the apparatus; at the same time the front door of the box is opened and the purchaser's check tape is also thrown backwardly from the point of issuing. The method of replacing the transfer ribbon needs no detailed explanation, except that for the sake of clearance it may be added that the top cover and the bottom of the box or main body of the apparatus are divided along the line 96 of Fig. 1, so consequently the bars 65 and 75, and their supporting studs 66 being attached to the top cover of the box, swing upwardly out of the way of the sides of the transfer ribbon and no portion of the mechanism of the apparatus is disarranged by this process, as the writing shelf 46 is attached to the front door of the box or main body of the apparatus.

The front door of the enclosing box or main body of the apparatus swings outwardly when unlocked and opened about the hinges 97, and is locked in a closed position at 98 in any suitable or approved manner.

The top cover of the box, or of the main body of the apparatus, with its contained and attached mechanism, swings upwardly about the hinges 95 when opened, as already explained, and when closed is retained in that position by spring fasteners 99, being locked in this position at 100—although other means of retaining it in closed position, other than the spring fasteners, above mentioned, such as for example, tap bolts or a spring lock, may be employed, if desired.

Each check produced by this apparatus is an integral check, requiring no extraneous information for its interpretation; is continuously printed during the action of the discharging portion of the apparatus in plain figures and graduations; is provided with an initial and a final index mark designating the amount of fluid dispensed at any given operation of the apparatus; and is also provided with a character designating the individual responsible for the above mentioned operation of the apparatus.

These checks are of such a nature that the owner's continuous record formed by a sequence of these checks can be readily totaled for any given time, say a day's business, by observing the number of times the ten gallon mark occurs upon his record and simply noting additionally the initial marking and the final marking of his record thus giving a useful and accurate meter reading and record for any given time.

A memorandum of the beginning and the closing of a day's business can be made and dated at the notation aperture of the apparatus, and wound up on the owner's record roll.

The position of the final index record mark with reference to figures and graduations designated is seen to be identical with that of the initial mark upon the next succeeding check; for the discharging apparatus remains locked during the interval between these markings.

A feature of this invention is found in the fact that its registration is determined by the relative positions of an index marker and the graduations of the printing roll, either or both of which may be varied in form without departing from the intent of the invention, while the paper tape serves merely as a vehicle for recording these relative positions.

When the apparatus is new, and the rubber tire of the compression roll relatively soft and elastic, the paper tape will be depressed considerably or crinkled between each of the graduations of the printing roll during the printing of the same; and also these graduations will be printed to an unnecessary length, overlapping the index mark position toward each end of the check.

Thus a new compression roll will produce a record somewhat longer and of greater extent than will be made when the compression roll has been worn by usage or hardened by the lapse of time; and in the case of the sale of a large amount of gasolene this variation in the extent of the record is considerable.

However, it is seen that the registration of the quantity of fluid dispensed is independent of the extent of the record or any variations in the same as mentioned above.

If desired, either the owner's record tape or the purchaser's record tape may be omitted from the apparatus; thus restricting it to a simple recording function either for the purchaser or the owner without departing from the spirit of the invention.

Disclosures of new inventive matter in this specification being capable of more general utility in the arts than as associated with the present invention, and herein claimed, are reserved as subject matter for separate application for patent by the inventor in which applications references will be made to this specification.

Many variations in the construction and details and the location and relative arrangement of parts would readily suggest themselves to those skilled in the art to which this invention relates and still fall within the spirit and scope of my invention; hence I do not desire to be limited to the exact construction herein set forth; but having explained the principles of my invention, and a preferred form of apparatus embodying it, and—

Having described the function, purpose and mode of operation of such apparatus what I claim as new and of my own invention, and desire to secure by Letters Patent of the United States is,—

1. In a recording fluid dispensing apparatus, embracing a continuously printing type-roll, the combination of a lock restricting the entire apparatus when locked, a key therefor for unlocking and locking the entire apparatus, separate recording means, and key retaining means operated therewith arranged and constructed to retain the said key within the apparatus until the recording means has been completely operated.

2. In a fluid dispensing apparatus with means for producing a continuously printed record, approximately corresponding to the amount of discharge, the combination of a lock restricting the entire apparatus from operation when locked, a key therefor for unlocking and locking the entire apparatus, separate means for imprinting an index mark upon said record; and key retaining means operated therewith, arranged and constructed to retain the said key within the apparatus until the said index imprinting means has been completely operated.

3. In a fluid dispensing apparatus with means for producing a continuously printed record, approximately corresponding to the amount of discharge, the combination of a lock restricting the entire apparatus from operation when locked, an identifying character marker, an index marker, a key for unlocking and locking the entire apparatus and positioning said identifying character marker, separate means for imprinting upon said record the said index mark and the said identifying character; and key retaining means operated therewith, arranged and constructed to retain the said key within the apparatus until the said imprinting means has been completely operated.

4. In a recording fluid dispensing apparatus, the combination with the discharging means thereof of a continuously printing roll, means for driving said printing roll commensurately with the amount of discharge, an owner's record tape, and a purchaser's record tape, a transfer ribbon, an index marker; and separate means for compressing the printing roll, tapes and ribbon together, imprinting upon the said tapes an index mark, releasing the discharging means, locking the discharging means, and again imprinting the said index mark and releasing the compression upon the printing roll, tapes and ribbon.

5. In a fluid dispensing apparatus with means for producing a continuously printed owner's record and a continuously printed purchaser's record, each record corresponding approximately to the amount of discharge, the combination of a lock restricting the entire apparatus from operation when locked, a key therefor for unlocking and locking the entire apparatus, separate means for imprinting an index mark upon said records; and key retaining means operated therewith, arranged and constructed to retain the said key within the apparatus until the said index imprinting means has been completely operated.

6. In a fluid dispensing apparatus producing a continuously printed owner's record and a continuously printed purchaser's record, the combination of a lock restricting the entire apparatus from operation when locked, an indentifying character marker, an index marker, a key for unlocking and locking the entire apparatus and positioning said identifying character marker, separate means for imprinting upon said records the said index mark and the said identifying character; and key retaining means operated therewith, arranged and constructed to retain the said key within the apparatus until the said imprinting means has been completely operated.

7. In a recording fluid dispensing apparatus, the combination with the discharging means and the record tape thereof of means for fixing upon said record tape a marking corresponding to the fluid discharge, an aperture for the issuance of said marked tape from the apparatus, and an inwardly flexible border for said aperture.

8. In a recording fluid dispensing apparatus, the combination with the discharging means and the record tape thereof of means for fixing upon said record tape a marking corresponding to the fluid discharge an aperture for the issuance of said marked tape from the apparatus, and an inwardly flexible border for said aperture having a severing edge thereat.

9. In a recording fluid dispensing apparatus, the combination with the discharging means thereof of a member moved solely by said discharging means during its discharging action only, an original record tape adjacent to said member, an additional record tape supply, linking means for coupling said additional record tape supply to the original record tape, and means for holding said original record tape upon said member during coupling.

10. In a recording fluid dispensing apparatus, the combination with the discharging means thereof of means for marking a record tape accordingly, an original record tape adjacent to said marking means, an additional record tape supply, linking means for coupling said additional record tape supply to the original record tape and means for holding said original record tape in fixed position during the coupling operation and for liberating said tapes sufficiently to allow the linked portion of the tapes to be moved past said member.

11. In a recording fluid dispensing apparatus, the combination with the main enclosed body thereof of fluid discharge recording means, a stud supported at the back of said body and extending away from said back, a roll of new supply record tape revolubly supported by said stud and slidably placeable thereupon and also slidably removable therefrom, original record tape supported within said body, holding means therefor and linking means for attaching the new record supply tape to the original record tape, of a door for the said body opening so as to expose said roll, record tapes, linking means, and the free end of said stud.

12. In a recording fluid dispensing apparatus, the combination with the main body thereof of fluid discharge recording means, a cover for said main body, a record tape, supporting and compressing means, and a writing shelf for said record tape carried by said main body, confining means and compression means, and a writing aperture for said record tape carried by said cover, said means being constructed and arranged so as to unitedly form in a closed position of the cover operative compression confining and supporting means for said record tape and to open in substantially the plane of the tape to liberate said tape, and means for securing said cover in closed position.

13. In a recording fluid dispensing apparatus, the combination with the main body thereof of fluid discharge recording means, a record tape, impressing means and supporting means for said record tape carried by said main body, a cover for said main body, complementary impressing means and confining means for said record tape carried by said cover, said means being constructed and arranged so as to unitedly form in a closed position of the cover operative impressing confining and supporting means for said record tape and to open in substantially the plane of the tape to liberate said tape, and means for securing said cover in closed position.

14. In a recording fluid dispensing apparatus, the combination with the discharging means thereof, of a record-tape, means for recording thereon the amount dispensed, connection from the said discharging means engaging said record-tape, said connection being constructed and arranged to both longitudinally move a portion of said record-tape proportional to the measurement of discharge outside the confines of the apparatus, and to prevent displacement of the record-tape relatively to said measurement of discharge.

15. In a recording fluid dispensing apparatus, the combination with the discharging means thereof, of a record tape, marking means engaging said record tape, connection from said discharging means engaging said record tape and moving said record tape relatively to the discharge for delivering a portion of said record tape outside the confines of the apparatus and preventing displacement of the record tape in the direction in which it is normally moved by the apparatus, during either of said engagements.

16. In a recording fluid dispensing apparatus, the combination with the discharging means thereof of a record tape, marking means constructed and arranged to record upon said record tape the amount of discharge from the motion of the discharging means, and pressure applying means for preventing the displacement of said record tape or marking means from proper position with relation to the discharging means.

17. In a recording fluid dispensing apparatus, the combination with the discharging means thereof of a printing roll, connections for driving said printing roll commensurately with the amount of discharge, a record tape, means for printing upon said record tape a record corresponding approximately to the amount of fluid discharge, and separate means for placing upon said record tape an index mark designating the amount of said fluid discharge.

18. In a recording fluid dispensing apparatus, the combination with the discharging means thereof of a continuously printing roll, connection for driving said printing roll commensurately with the amount of discharge, an index marker, inking means, a record tape, and separate means for compressing the printing roll and tape together, imprinting upon the tape an index mark, releasing the discharging means, locking the discharging means and again imprinting the said index mark, and releasing the compression upon the printing roll and tape.

19. In a recording fluid dispensing apparatus, the combination with the discharging means thereof, a cylindrical roll bearing registering projections upon its surface, connections for driving said cylindrical roll commensurately with the amount of discharge, a record tape, means for printing upon said record tape a record approximately corresponding to the amount of fluid discharge, and separate means for placing upon said record tape an index mark indicating the amount of said fluid discharge; of a lock restricting the entire apparatus when locked, a key therefor for unlocking and locking the entire apparatus, and key retaining means operating therewith arranged and constructed to retain the said key within the apparatus until the final imprinting of the said index mark has been made.

20. In a recording fluid dispensing apparatus, the combination with the discharging means thereof, a cylindrical roll bearing registering projections upon its surface, connections for driving said cylindrical roll commensurately with the amount of discharge, a record tape, and an index marker, of separate means for compressing said roll, tape and index marker together, and imprinting upon the tape a record bearing the index mark, releasing the discharging means and subsequently locking the discharging means, again imprinting a record bearing the index mark, and releasing the compression upon said cylindrical roll, tape, and index marker.

21. In a recording fluid dispensing apparatus, the combination with the discharging means thereof, a cylindrical roll bearing registering projections upon its surface, connections for driving said cylindrical roll commensurately with the amount of discharge, a record tape, and an index marker; of separate means for compressing said roll, tape and index marker together and imprinting upon the tape a record bearing the index mark.

22. In a recording fluid dispensing apparatus, the combination with the discharging means thereof, a cylindrical roll bearing registering projections upon its surface, connections for driving cylindrical roll commensurately with the amount of discharge, a record tape and an index marker, a separate means of compressing said roll, tape and index marker together, and imprinting upon the tape a record bearing the index mark and later releasing the compression upon said cylindrical roll, tape and index marker.

23. In a recording fluid dispensing apparatus, the combination with the record strip thereof of means for printing graduations upon said strip only during the discharge of fluid therefrom.

24. In a recording fluid dispensing apparatus, the combination with the record-strip thereof of means for coincidently printing and advancing said record-strip in proportion to the amount of discharge therefrom.

25. In a recording fluid dispensing apparatus, the combination with the record-strip thereof of a single means constructed and arranged to unitedly both print and advance said record-strip coincidently with and proportionally to the rate of flow of fluid therefrom.

26. In a recording fluid dispensing apparatus, the combination with the record-strip thereof of means for placing upon said record-strip, preliminary to and during a given discharge therefrom, marks, all of which unitedly but not separately form quantity denoting marks for said given discharge.

27. In a recording fluid dispensing apparatus, the combination of means for printing graduations upon the record-strip thereof during the discharge of fluid therefrom, with separate means not operative during discharge constructed and arranged to place upon said record-strip a marking denoting the quantity of discharge.

EDWIN S. MATTHEWS.